Feb. 9, 1937.  H. B. PHILIPS  2,070,176
AUTOMATIC CLUTCH CONTROL
Filed Feb. 11, 1933  2 Sheets-Sheet 1
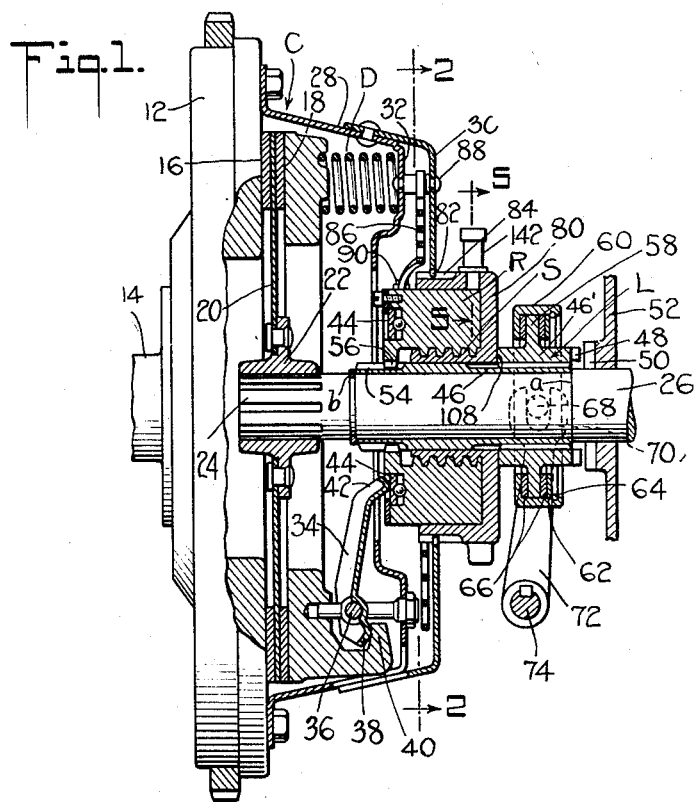
INVENTOR
Herman B. Philips
BY
James & Franklin
ATTORNEYS

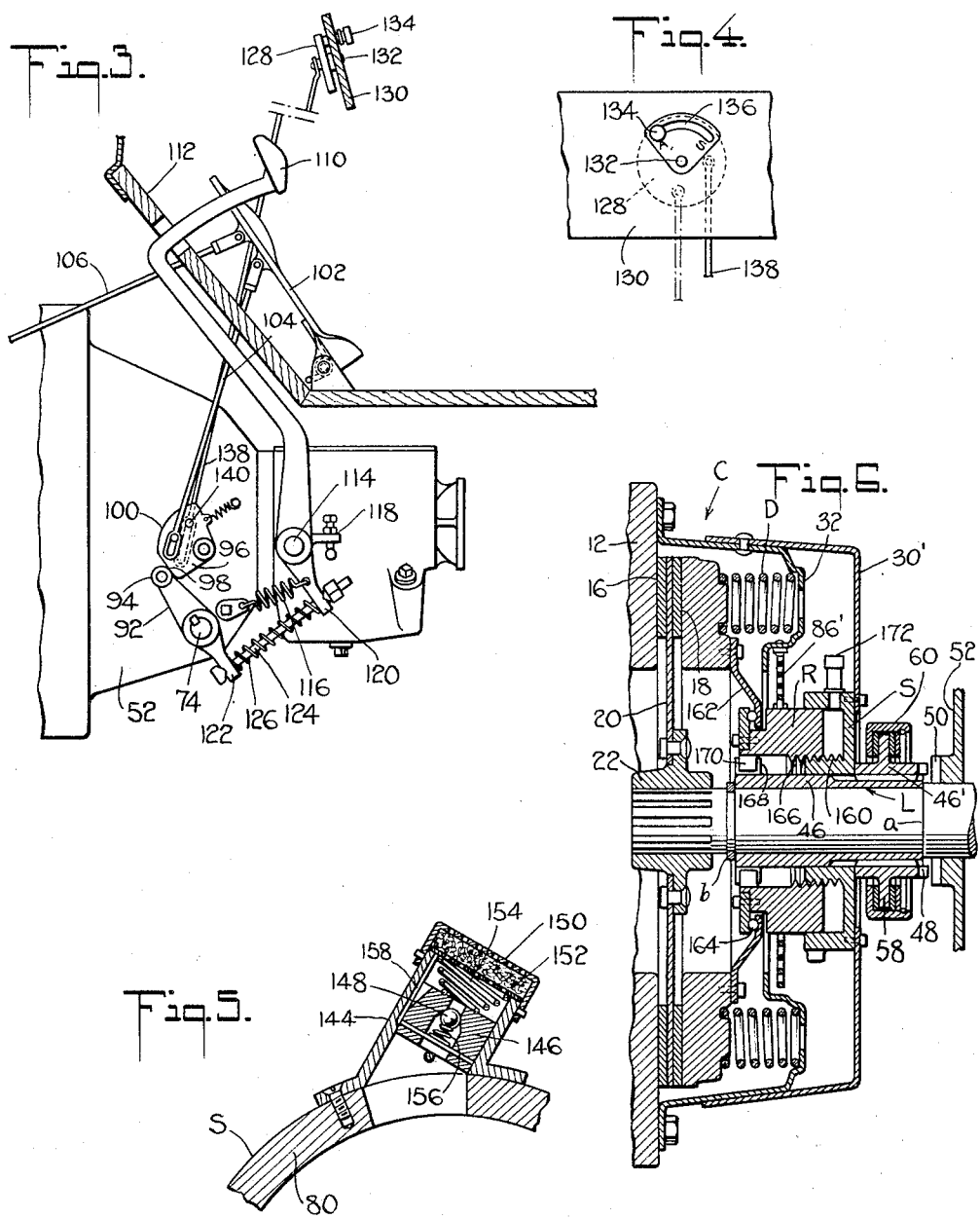

Patented Feb. 9, 1937

2,070,176

UNITED STATES PATENT OFFICE 2,070,176

AUTOMATIC CLUTCH CONTROL

Herman B. Philips, New York, N. Y.

Application February 11, 1933, Serial No. 656,210

22 Claims. (Cl. 192—.01)

This invention relates to clutches and control mechanisms therefor, and more particularly to an automatically controlled clutch mechanism for automobiles.

The general object of the present invention resides in the provision of mechanism for automatically controlling an automobile clutch, which mechanism will be compact, self-contained, located within the clutch housing and preferably forming a part of the clutch assembly, and not necessitating accessory control mechanism such as a piston operated by engine suction or like accessory apparatus.

A more particular object of my invention resides in the provision of mechanical clutch control mechanism for controlling the operation of automobile clutches of conventional type, such clutches being normally engaged and held in engagement by resilient means. Another object of my invention resides in the provision of mechanically operated clutch controlling mechanism which will disengage the clutch by effort obtained directly from the engine power, so that only negligible force need be exerted by the driver of the vehicle.

Further objects of my invention are to combine with such a mechanical clutch control mechanism self-contained air cushioning means for insuring a gradual or gentle engagement of the clutch, and still further objects of my invention are to make the speed of engagement a variable, dependent upon either the speed of the engine or the acceleration of the engine, or both.

Still further objects of my invention are to make possible positive control of the clutch mechanism, so that the engine compression may be used for braking the vehicle, and to further provide for conventional operation of the automobile when desired. This latter feature, however, is not essential, and, in one form of my invention later described, pedal operation of the clutch is entirely dispensed with.

To the accomplishment of the foregoing and such other objects as will hereinafter appear, my invention consists in the clutch control mechanism and the elements thereof and their relation one to the other, as hereinafter are more particularly described in the specification and sought to be defined in the claims. The specification is accompanied by drawings, in which:

Fig. 1 is a vertical section taken through a single plate dry disc clutch provided with my clutch control mechanism;

Fig. 2 is a section taken in the plane of the line 2—2 in Fig. 1;

Fig. 3 is a vertical elevation showing the manner in which the clutch control mechanism is related to the operating pedals of the automobile;

Fig. 4 is a detail of the dashboard control;

Fig. 5 is an enlarged detail section taken in the plane of the line 5—5 in Fig. 1; and Fig. 6 is a section generally similar to Fig. 1 but taken through a modified construction embodying features of my invention.

Referring to the drawings and more particularly to Fig. 1 thereof, the control mechanism of my invention is shown applied to a clutch C of conventional type, the present clutch being of the single plate dry disc type provided with resilient means exemplified by the spring D for normally causing clutch engagement. The clutch control mechanism includes mating threaded elements R and S which are relatively movable both rotatively and axially, one of said elements, in this case S, being rotated by the driving portion of the clutch C. The clutch mechanism is further provided with lock means L for optionally arresting or permitting rotation of the other threaded element, in this case R. The resulting axial movement of the threaded element R is used for disengaging the clutch, the desired disengagement being obtained in conventional fashion, as will be evident from an inspection of the drawings. It will thus be apparent that the only external force needed to cause clutch disengagement is that applied to the lock means L, for thereafter the engine power rotating the driving portion of the clutch C is itself mechanically applied through the mating threaded elements R and S to disengage the clutch in opposition to the relatively powerful resilient means D normally causing engagement of the clutch.

Considering the mechanism in greater detail, the clutch C is bolted directly to the engine fly wheel 12, the latter being secured to the engine shaft 14 in conventional manner. The clutch comprises driving rings 16 and 18 between which there is frictionally clampable a driven disc 20 itself secured to a splined hub 22 mating with the splined end 24 of the driven shaft 26, the latter ordinarily extending directly into the transmission or gear set. The clutch is further made up of an annular cover element 28 bolted directly to fly wheel 12, while the clutch cover is completed by the additional element 30. The interior support ring 32, formed by the inner edge of the annular cover element 28, is used to support a series, say, nine, spaced compression springs, such as the spring D, the forward ends of which bear directly against the clutch driving ring 18. Upon the support ring 32 there are additionally mounted a series, say, three, release levers 34, pivoted at 36 and bearing at their outer ends 38 against appropriate abutments 40 on clutch ring 18. The inner ends 42 of levers 30 rest on an axially movable thrust bearing 44. The arrangement as so far described is conventional, and it will be understood that forward movement of thrust bearing 44 causes retraction of the clutch driving ring 18 against the compression of springs D and thereby releases the driven disc 20, thus disengaging the clutch. One of the advantages of my automatic clutch control mechanism is that it may thus be applied to a conventional automobile clutch with no significant alteration of the clutch mechanism itself.

The lock member L is generally in the form of a sleeve 46 which is freely rotatable on the driven shaft 26 and a second sleeve 46' splined thereto which is reciprocal on the sleeve 46. The shaft 26 is provided with a stop shoulder *a* coacting with one end of the sleeve 46, and any appropriate means, such as the split resiliently contractible thrust ring *b*, engaging the forward end of the sleeve 46, thereby axially locating the sleeve. The sleeve 46' is provided at its rear end with teeth 48 adapted, upon rearward movement of the same, to mate with fixed teeth 50 formed on the stationary clutch housing 52. The forward end of sleeve 46 is provided with splines 54 which mate with teeth 56 formed on the threaded element or runner R. Splines 54 are made of predetermined length to limit the permissible forward movement of the runner R when the runner and the screw S are relatively rotated. Sleeve 46' is further provided with a collar portion 58 received in a bearing ring 60, the assembly of said bearing ring being completed by a flange 62 held in place by an expansible lock ring 64. Graphite washers 66 are provided within the bearing ring 60, thereby making the same self-lubricating. Bearing ring 60 is further provided with a pair of outwardly projecting pins or trunnions 68 received in the forked upper ends 70 of a pair of operating levers 72 secured to a rock shaft 74 extending horizontally through the lower portion of the clutch housing. The lock sleeve L is shown in its normal or driving position in Fig. 1, and it will be evident that the sleeve 46' thereof may be moved rearwardly from this normal driving position to lock the same against rotation, by appropriately moving the rock shaft 74.

The screw S is preferably formed integrally with an annular case 80, and the resulting combined element will, for convenience be referred to as the screw case S. The screw case S is freely rotatable on lock sleeve L. It is also axially movable with respect to the clutch C but is compelled to rotate with the clutch by reason of appropriate teeth 82 projecting radially inwardly from the clutch cover 30 and mating with the splines 84 cut in the outer periphery of the case 80.

The runner R is, in effect simply a threaded nut mating with the screw S. It is preferably made cylindrical in shape and dimensioned to closely fit in the screw case S. The forward end of the runner is provided with the teeth 56 heretofore referred to, which mate with splines 54 cut in the forward end of lock sleeve L. The runner R carries the thrust bearing 44 which bears against the release arms 34 of the clutch. The runner R and screw case S are normally urged into the fully threaded relation shown in Fig. 1 by resilient means, here exemplified by a spiral spring 86 the outer end of which is secured to the clutch cover by an appropriate pin 88, and the inner end of which is secured to the runner at 90.

The manner in which the locking of sleeve L is obtained may be explained in connection with Fig. 3 of the drawings. In this figure the clutch housing is indicated at 52, while the rock shaft 74, heretofore referred to, extends out of the clutch housing, as shown. The outer end of rock shaft 74 has keyed thereto a rock arm 92 carrying a cam follower 94 bearing against an operating cam 96 the lower portion 98 of which progresses in radius so as to oscillate the rock arm 92 counter-clockwise, and the upper part 100 of which is arcuate so as to maintain the rock arm in position after its initial movement. Cam 96 is moved by an accelerator pedal 102 which may be of conventional type and which is connected to cam 96 by an appropriate link 104. The accelerator pedal 102 is, of course, also connected to the engine throttle in conventional manner through an appropriate push rod 106. It will thus be evident that when the accelerator pedal 102 is depressed, the initial movement of the pedal causes a slight counter-clockwise movement of rock shaft 74, and that thereafter continued downward movement of the accelerator pedal simply maintains the rock shaft in the position thus established. When the driver's foot is removed from the accelerator pedal, however, the cam 96 is moved to its starting position and thus permits rock shaft 74 to oscillate slightly in a clockwise direction to its initial position.

The operation of the mechanism as so far described will, it is thought, be evident from simultaneous examination of Figs. 1 and 3 of the drawings. With the engine idling, the accelerator pedal 102 is raised, cam 96 is raised, rock shaft 74 is moved clockwise, and bearing ring 60 and consequently the lock sleeve 46' are moved rearwardly, teeth 48 and 50 being engaged and the sleeve L thereby locked against rotation. The runner R is forced forward by rotation of screw case S, the latter, of course, being rotated by the idling engine. As runner R is forced forward, it releases or disengages clutch C. At the same time the spring 86 is coiled or tightened. Runner R moves forwardly until teeth 56 are freed from splines 54, whereupon the runner rotates with the screw case and clutch and fly wheel. Consequently, as the engine idles, the clutch is continuously held in released condition, and this without any effort on the part of the driver. When the driver accelerates the engine by depressing pedal 102, cam 96 is moved downwardly, rock arm 92 and rock shaft 74 are moved counter-clockwise, and bearing ring 60 and lock sleeve 46' are moved forwardly to the normal driving position shown in Fig. 1, thereby permitting the sleeve L to rotate. Teeth 56 of runner R immediately re-enter splines 54, and spiral spring 86 causes relative rotation of the runner R and screw case S, restoring the runner to the fully threaded position shown in Fig. 1, and thereby permitting engagement of the clutch. This engagement of the clutch is maintained as long as the accelerator pedal is even partially depressed, but, of course, when the accelerator pedal is fully released, the sleeve 46' is again locked and the clutch disengaged. This disengagement may be utilized when the car is started and between gear shifts, and may further be utilized when the car is running in high gear to permit coasting or free-wheeling on down grades.

The clutch mechanism shown further provides for ordinary pedal operation of the clutch, should this be desired. Referring to Fig. 1, it will be noted that the sleeve 46' and screw case S meet in a thrust bearing face 108, whereby movement of the sleeve 46' forward of the normal driving position shown in Fig. 1 causes forward movement of the screw case S, the runner R, and consequently disengagement of the clutch in conventional fashion. The necessary forward movement of screw case S is permitted by appropriate elongation of the splines 84 formed on the outer periphery of the screw case. The necessary forward movement of the sleeve 46' is, of course, obtained by counter-clockwise oscillation of rock shaft 74.

Referring now to Fig. 3 of the drawings, a conventional clutch pedal 110 passes through the floor board 112 and is pivoted at 114. The pedal is normally held upward by a tension spring 116, the resulting motion being limited by an adjustable stop 118. A downward extension 120 of the pedal lever is connected to a downward extension 122 of rock arm 92 by means of a tension link 124 which is preferably surrounded by a compression spring 126. It will be evident that pressure applied to clutch pedal 110 causes counter-clockwise oscillation of the clutch pedal and with it counter-clockwise oscillation of rock shaft 74. This forces the sleeve 46' forward and thereby causes a direct disengagement of the clutch under pedal control. When driving with the accelerator pedal 102 depressed, the resulting slight counter-clockwise oscillation of rock arm 92 is, of course, accommodated by compression of spring 126, and in any case even if such lost motion were not provided, would merely result in a slight downward movement of the clutch pedal 110.

As so far described, either pedal or automatic operation of the clutch may be employed, but additional means is preferably provided to make the automatic clutch control inoperative at the option of the driver, so that the car may be operated wholly in conventional manner. For this purpose, any desired operating element is provided to move cam 96 downwardly a small amount, thereby limiting the rearward movement of the sleeve 46' to the intermediate position shown in Fig. 1. A specific mechanism for this purpose is indicated in Figs. 3 and 4 and comprises an oscillatable crank or disc 128 pivoted behind the dashboard 130 on a bearing pin 132. The disc 128 may be oscillated between either of two extreme positions by a manually movable control button 134 connected to crank disc 128 and slidable in an arcuate slot 136 cut through the dashboard 130. A link 138 extends downwardly from the crank disc 128 to a pin 140 on the cam 96. The parts are so related that when the button 134 is moved to the left or "automatic" position, the link 138 is elevated and does not interfere with the normal operation of cam 96, as heretofore described. When button 134 is, however, oscillated to the right or "conventional" position, the link 138 is forced downwardly and moves cam 96 downwardly enough to cause release of the lock sleeve L. The automatic clutch mechanism is thereby made inoperative and the clutch can only be operated by moving the sleeve 46' forwardly from the normal driving position shown in Fig. 1, this necessary movement being obtained by depression of clutch pedal 110. When thus driving in conventional fashion, the movements of accelerator pedal 102 simply cause oscillation of cam 96 about the constant radius portion 100 of the cam. The cam is, of course, free of rod 138 for downward movement by reason of the slotted lower end of rod 138, and, similarly, cam 96 is free of rod 104 and accelerator pedal 102 for the small movement caused by manipulation of the dashboard control knob 134 by reason of the slotted lower end of the rod 104.

The clutch engagement provided by the mechanism which I have already described is relatively slow because of the screw thread movement used to obtain the clutch control. However, if it is desired to further cushion the clutch engagement, I may relatively conveniently trap air between the runner R and screw case S for this purpose. I therefore preferably provide the screw case S with an air check valve 142, and this valve is arranged to permit free passage of air into the screw case but to stop discharge of air therefrom, thus forcing the air to leak around the runner and through the screw threads between the runner and screw case. This slows the clutch engagement and effectively prevents grabbing of the clutch.

If desired, I may go further and arrange for variably limiting the speed of engagement, so that the speed of clutch engagement may be varied, for example, as a function of the engine speed or, if preferred, as a function of the acceleration of engine speed, and even as a function of both engine speed and acceleration. A valve suitable for this purpose is illustrated in the enlarged section of Fig. 5, and comprises a valve body 144 containing a slidable plunger 146 which itself carries a ball check valve 148. The valve case 144 is closed by a cap 150 which preferably contains filter material 152. The cylinder 146 is normally held in its downward or inward position by a spring 154, while the ball 148 is normally held in its upward or outward position by a spring 156. When the runner R moves forward, air is readily drawn into screw case S past the ball 148. When the runner is restored into the screw case, air is compressed and checked by ball 148. Increased engine speed tends, however, to force cylinder 146 outwardly by centrifugal force, thereby uncovering a bypass groove or port 158 and thus permitting air to escape from the screw case through the cap 150. As so far described, the valve body 144 may be arranged radially with respect to the screw case 80. If, however, it is desired to vary the cushioning action as a function of acceleration, the valve case may be sloped in a rearward or trailing direction, as is shown in Fig. 5, so that the inertia of the slidable element 146 causes it to move outwardly when the engine is accelerated. It will thus be evident that for fast get-away and upon rapid acceleration of the engine, the clutch engagement is speeded up. When resorting to variably controlled clutch engagement, such as is here described, it, of course, becomes desirable to make the running fit between the runner R and the screw case S with precision and nicety in order to minimize air leakage around the runner. It will also be evident that the air cushioning action may be varied either as a function of speed or acceleration, as well as both, and, further, that should some drivers prefer a more gradual clutch engagement upon faster engine speed, instead of vice versa, as described, the valve mechanism may be rearranged to fulfill this desire.

If the automatic clutch control mechanism is relied upon entirely and the clutch pedal is wholly eliminated, the clutch mechanism may itself be simplified, and a form of my invention modified for this purpose is shown in Fig. 6. Referring thereto, the clutch C comprises driving rings 16 and 18 secured to fly wheel 12 and between which there is located a driven disc 20, just as has already been described. The driving ring 18 is urged toward driving face 16 by a series of compression springs D supported between the driving ring 18 and the support ring 32. The clutch cover is completed by element 30' which need not be splined to screw base S as before, but may instead be rigidly affixed thereto. The screw case mates with a runner R, but in the present case the screw thread 160 between the runner R and screw case S is a left-hand rather than a right-hand thread. Instead of the clutch release levers 34 and accompanying mechanism, the clutch ring 18 has directly affixed thereto a dished plate 162 the inner edge of which is carried in an appropriate thrust bearing 164 formed at the forward end of runner R. It will thus be evident that the clutch is disengaged by rearward movement of the runner R, rather than by forward movement thereof, and, conversely, that the clutch is released or disengaged upon rearward movement of the runner R.

As before, the mechanism includes a lock sleeve L which again includes a collar 58 surrounded by a ring bearing 60 and lock teeth 48 adapted to engage mating lock teeth 50 on the clutch housing 52. The present sleeve L differs from that heretofore described by the provision of an annular space or clearance ring 166 between the splines 168 and the screw thread 160. The runner R is provided with teeth 170 making with splines 168. The proportioning of the parts is such that when the runner is threaded fully into the screw case, the teeth 170 leave splines 168 and enter annular space 166, and are therefore free to rotate with the screw case S. Here again the runner R and screw case S are preferably interconnected by resilient means in the form of a spiral spring 86' the inner end of which is secured to the runner, and the outer end of which is secured to the clutch cover, but in this case the said spring 86', while wound as before, tends always to turn the runner R out of fully threaded relation with the screw case S.

The operation of this form of the invention will, it is believed, be understood by comparison with the principles explained in connection with the first form of the invention. Briefly, bearing ring 60 is connected to the accelerator pedal in a manner similar to that shown in Fig. 3, so that release of the accelerator pedal causes element 46' of lock sleeve L to move rearwardly into locked engagement, while initial depression of the accelerator pedal moves the same forwardly and frees the lock sleeve for rotation. When the sleeve L is locked, the splines 168 prevent runner R from rotating, and the runner is accordingly screwed into the screw case, thereby disengaging the clutch and at the same time tightening spring 86'. When the clutch is disengaged, the runner rotates freely with the screw case and the clutch cover or driving members of the clutch. When the accelerator is depressed, however, sleeve L is released and spring 86' immediately causes restoring rotation of the runner R, thereby moving the runner forwardly and permitting the clutch to engage.

Here again the screw case S may, if desired, be provided with appropriate air check valve mechanism 172, but in the present case the direction of the check valve should, of course, be reversed so as to prevent admission of air, thereby creating a vacuum within the screw case, except for leakage around the runner, but freely permitting discharge of air from the screw case so as not to hinder the clutch disengagement.

Additional refinements for variable rate of clutch engagement, dependent upon either engine speed or engine acceleration, or both, may, if desired, be provided.

It will be understood that the dashboard control, described in connection with Fig. 3 and making possible conventional operation of the automobile, represents a simple and effective way to change the automobile, when coasting, from a free-wheeling condition to conventional condition, with the engine operating as a braking medium. In other words, should the driver become alarmed in descending a steep grade, he may readily and instantaneously restore conventional conditions by moving the dashboard control knob.

A dashboard button control may be used in connection with the second form of the invention herein disclosed, for the sole purpose of providing positive clutch engagement on steep down grades.

It is believed that the mode of constructing and applying the automatic clutch control mechanism of my invention, and the many advantages thereof, will be apparent from the foregoing description. In operation, the clutch is released when the accelerator pedal is released, and, conversely, the clutch is engaged when the accelerator pedal is depressed. The necessary force for disengagement is obtained from the engine, rather than from pedal operation. No external accessories or special air line systems connected with the engine intake are needed, and the entire clutch control unit is compact, self-contained, and built right into the clutch itself. In the first form of the invention no change is made in the clutch mechanism per se, and this may be of long-tried and dependable design. The regular thrust bearing which releases the clutch is retained, and the present system merely provides two different ways for moving the said bearing, one of which coincides with the conventional clutch pedal operation, and the other of which provides for automatic control of the clutch. The speed of clutch engagement may be regulated and cushioned as desired, and may even be varied in dependence on the speed of the engine or the acceleration of the engine, or both. Instantaneous change-over to conventional driving conditions is readily made.

It will be appreciated that the lock sleeve in either form of the invention may be stopped by any appropriate mechanism other than that shown.

Because of such manifest changes, it will be apparent that while I have shown and described my invention in preferred forms, many modifications may be made in the structures disclosed without departing from the spirit of the invention, defined in the following claims.

I claim:

1. An automatic clutch mechanism comprising a clutch provided with resilient means normally causing clutch engagement, control mechanism for disengaging the clutch with power assistance, including mating threaded elements, means connected with the driving shaft for rotating one of said elements, means to arrest rotation of the other element, and means responsive to the resulting axial relative movements of the elements for disengaging the clutch, and additional externally accessible means for bodily moving both threaded elements axially in order to disengage the clutch without power assistance.

2. An automatic clutch mechanism comprising a clutch, mating threaded elements which are relatively movable both rotatively and axially, said elements having a plurality of convolutions of a continuous cylindrical thread, in order to obtain substantial movement while keeping the pitch of the thread moderate in amount, means on the driving portion of the clutch for rotating one of said elements, means to optionally arrest or permit rotation of the other element, and means responsive to the resulting axial movement of one element relative to the other for disengaging the clutch, whereby the engine power is itself mechanically applied through said threaded elements for disengaging the clutch.

3. An automatic clutch mechanism comprising a clutch, mating threaded elements which are relatively movable both rotatively and axially, said elements having a plurality of convolutions of a continuous cylindrical thread, in order to obtain substantial movement while keeping the pitch of the thread moderate in amount, means on the driving portion of the clutch for rotating one of said elements, lock means to optionally arrest or permit rotation of the other element, means responsive to the resulting axial relative movement of the elements for disengaging the clutch, and resilient means interconnecting the threaded elements for restoring the same to initial condition when the lock means is released.

4. An automatic clutch mechanism comprising a clutch provided with resilient means normally causing clutch engagement, and control mechanism including an axially movable element, means on the driving portion of the clutch for axially moving said element, means responsive to the resulting axial movement for disengaging the clutch, an accelerator pedal, and means interconnecting the accelerator pedal and the clutch for making the element moving means ineffective upon depression of the accelerator pedal.

5. An automatic clutch mechanism comprising a clutch provided with resilient means normally causing clutch engagement, and control mechanism including mating threaded elements, means connected with the driving shaft for rotating one of said elements, lock means to arrest rotation of the other element, means responsive to the resulting axial relative movement of the elements for disengaging the clutch, an accelerator pedal, and means interconnecting the accelerator pedal and the lock means for making the lock means ineffective upon depression of the accelerator pedal.

6. An automatic clutch mechanism comprising a clutch, mating threaded elements which are relatively movable both rotatively and axially, means on the driving portion of the clutch for rotating one of said elements, lock means to optionally arrest or permit rotation of the other of the elements, means responsive to the resulting axial movement of one element relative to the other for disengaging the clutch, whereby the engine power is itself mechanically applied through said threaded elements for disengaging the clutch, an accelerator pedal, and means interconnecting the accelerator pedal and the lock means for making the lock means effective when the accelerator pedal is released and ineffective when the accelerator pedal is depressed.

7. An automatic clutch mechanism comprising a clutch, mating threaded elements which are relatively movable both rotatively and axially, means on the driving portion of the clutch for rotating one of said elements, lock means to optionally arrest or permit rotation of the other of the elements, means responsive to the resulting axial relative movement of the elements for disengaging the clutch, an accelerator pedal, and means interconnecting the accelerator pedal and the lock means for making the lock means effective when the accelerator pedal is released and ineffective when the accelerator pedal is depressed, and resilient means interconnecting the threaded elements for restoring the same to initial condition when the lock means is made ineffective.

8. The combination with an automobile clutch of automatic clutch control mechanism including a screw rotatable with the driving portion of the clutch, a runner threadedly engaging said screw, resilient means interconnecting the screw and runner and tending normally to keep the same in desired relation, means for locking the runner against rotation while permitting axial movement thereof, and means responsive to the resulting axial movement of the runner for disengaging the clutch.

9. The combination with an automobile clutch of automatic clutch control mechanism including a screw rotatable with the driving portion of the clutch, a runner threadedly engaging said screw, means for locking the runner against rotation while permitting axial movement thereof, said means including a rotatable sleeve having means to lock the sleeve against rotation and splines mating with teeth on the runner, and means responsive to the resulting axial movement of the runner for disengaging the clutch.

10. The combination with an automobile clutch of automatic clutch control mechanism including a screw rotatable with the driving portion of the clutch, a runner threadedly engaging said screw, resilient means interconnecting the screw and runner and tending normally to keep the same in desired relation, means for locking the runner against rotation while permitting axial movement thereof, said means including a rotatable sleeve having means for engaging the clutch housing to lock the sleeve against rotation and splines mating with teeth on the runner, and means responsive to the resulting axial movement of the runner for disengaging the clutch.

11. The combination with an automobile clutch of automatic clutch control mechanism including a screw rotatable with the driving portion of the clutch, a runner threadedly engaging said screw, resilient means interconnecting the screw and runner and tending normally to keep the same in fully threaded relation, means for locking the runner against rotation while permitting axial movement thereof, said means including a sleeve having means for engaging the clutch housing to lock the sleeve against rotation and splines mating with teeth on the runner, said splines being of predetermined length to limit the axial movement of the runner, and means responsive to the resulting axial movement of the runner for disengaging the clutch.

12. The combination with an automobile clutch of automatic clutch control mechanism including a case screw rotatable with the driving portion of the clutch, a runner threadedly engaging and closely fitting said case screw, means for optionally locking the runner against rotation while permitting axial movement thereof, means responsive to the resulting axial movement of the runner for disengaging the clutch, and an air valve on said case screw for limiting the speed of clutch engagement.

13. The combination with an automobile clutch of automatic clutch control mechanism including a case screw rotatable with the driving portion of the clutch, a runner threadedly engaging and fitting said case screw, means for optionally locking the runner against rotation while permitting axial movement thereof, means responsive to the resulting axial movement of the runner for disengaging the clutch, an air valve on said case screw for limiting the speed of clutch engagement, and means for variably determining the limiting action of the air valve as a function of the speed of the engine.

14. The combination with an automobile clutch of automatic clutch control mechanism including a case screw rotatable with the driving portion of the clutch, a runner threadedly engaging and fitting said case screw, means for optionally locking the runner against rotation while permitting axial movement thereof, means responsive to the resulting axial movement of the runner for disengaging the clutch, an air valve on said case screw for limiting the speed of clutch engagement, and means for variably determining the limiting action of the air valve as a function of the acceleration of the engine.

15. The combination with an automobile clutch of automatic clutch control mechanism including a case screw rotatable with the driving portion of the clutch, a runner threadedly engaging and fitting said case screw, resilient means interconnecting the case screw and runner and tending normally to keep the same in desired relation, means for optionally locking the runner against rotation while permitting axial movement thereof, means responsive to the resulting axial movement of the runner for disengaging the clutch, an air valve on said case screw for limiting the speed of clutch engagement while permitting rapid disengagement, and means for variably determining the limiting action of the air valve, said means being controlled by inertia and by centrifugal force.

16. The combination with an automobile clutch of automatic clutch control mechanism including a screw rotatable with the driving portion of the clutch, a runner threadedly engaging said screw, resilient means interconnecting the screw and runner and tending normally to keep the same in desired relation, lock means for locking the runner against rotation while permitting axial movement thereof, means responsive to the resulting axial movement of the runner for disengaging the clutch, an accelerator pedal, and means so interconnecting the accelerator pedal and the lock means that depression of the accelerator pedal unlocks the same.

17. The combination with an automobile clutch of automatic clutch control mechanism including a screw rotatable with the driving portion of the clutch, a runner threadedly engaging said screw, means for locking the runner against rotation while permitting axial movement thereof, said means including a rotatable sleeve having means to lock the sleeve against rotation and splines mating with teeth on the runner, means responsive to the resulting axial movement of the runner for disengaging the clutch, an accelerator pedal, and means so interconnecting the accelerator pedal and the sleeve that depression of the accelerator pedal unlocks the sleeve while release of the accelerator pedal locks the sleeve.

18. The combination with an automobile clutch of automatic clutch control mechanism including a screw rotatable with the driving portion of the clutch, a runner threadedly engaging said screw, resilient means interconnecting the screw and runner and tending normally to keep the same in threaded relation, means for locking the runner against rotation while permitting axial movement thereof, said means including a rotatable sleeve having means for engaging the clutch housing to lock the sleeve against rotation and splines mating with teeth on the runner, means responsive to the resulting axial movement of the runner for disengaging the clutch, an accelerator pedal, and means so interconnecting the accelerator pedal and the sleeve that depression of the accelerator pedal unlocks the sleeve while release of the accelerator pedal locks the sleeve.

19. The combination with an automobile clutch of automatic and pedal clutch control mechanism comprising a screw rotatable with and reciprocable relative to the clutch, a runner threadedly engaging the screw, means to arrest rotation of the runner including a rotatable sleeve having means to lock the sleeve against rotation and splines engaging teeth on the runner, means responsive to resulting axial movement of the runner for disengaging the clutch, bearing means between the sleeve and screw whereby movement of the sleeve moves the screw and runner and directly disengages the clutch, a clutch pedal, an accelerator pedal, means interconnecting the clutch pedal and sleeve for direct disengagement of the clutch, and means interconnecting the accelerator pedal and the sleeve for locking the sleeve when the accelerator pedal is released and unlocking the sleeve when the accelerator pedal is depressed.

20. The combination with an automobile clutch of automatic and pedal clutch control mechanism comprising a screw rotatable with and reciprocable relative to the clutch, a runner threadedly engaging the screw, resilient means interconnecting the screw and runner and tending normally to thread the same together, means to arrest rotation of the runner including a rotatable sleeve having means to lock the sleeve against rotation and splines engaging teeth on the runner, means responsive to resulting axial movement of the runner for disengaging the clutch, bearing means between the sleeve and screw whereby movement of the sleeve moves the screw and runner and directly disengages the clutch, a clutch pedal, an accelerator pedal, means interconnecting the clutch pedal and sleeve for direct disengagement of the clutch, means interconnecting the accelerator pedal and the sleeve for locking the sleeve when the accelerator pedal is released and unlocking the sleeve when the accelerator pedal is depressed, and optionally usable means to make the sleeve locking means inoperative.

21. The combination with an automobile clutch of automatic and pedal clutch control mechanism comprising a screw rotatable with and reciprocable relative to the clutch, a runner threadedly engaging the screw, resilient means interconnecting the screw and runner and tending normally to thread the same together, means to arrest rotation of the runner including a rotatable sleeve having means to lock the sleeve against rotation, and splines on said sleeve engaging teeth on the runner, means responsive to resulting axial movement of the runner for disengaging the clutch, bearing means between the sleeve and screw whereby forward movement of the sleeve forces the screw and runner forward and directly disengages the clutch, a clutch pedal, an accelerator pedal, means interconnecting the clutch pedal and sleeve for moving the sleeve forwardly for direct disengagement of the clutch, means interconnecting the accelerator pedal and the sleeve for causing locking movement of the sleeve when the accelerator pedal is released and unlocking movement of the sleeve when the accelerator pedal is depressed, and optionally usable stop means for so limiting the movement of the sleeve as to prevent locking of the sleeve, thereby establishing conventional conditions in the control of the automobile.

22. An automatic clutch mechanism comprising driving and driven shafts and a clutch provided with resilient means normally causing clutch engagement, an externally accessible operating lever for disengaging the clutch in opposition to the resilient means without power assistance, and additional control mechanism for disengaging the clutch with power assistance including a one-piece axially movable element around one of the shafts, means actuated by the driving portion of the clutch, said means being arranged to move said element when the clutch is to be disengaged, and means responsive to the resulting axial movement for disengaging the clutch.

HERMAN B. PHILIPS.